(12) United States Patent
Wang (10) Patent No.: US 9,991,695 B2
(45) Date of Patent: Jun. 5, 2018

(54) CHARGING CIRCUIT INTERRUPT DEVICES WITH SELF-TEST AND METHODS THEREOF

(71) Applicant: DELTA ELECTRONICS, INC., Taoyuan (TW)

(72) Inventor: Ming-Whang Wang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 148 days.

(21) Appl. No.: 14/850,359

(22) Filed: Sep. 10, 2015

(65) Prior Publication Data

US 2016/0344177 A1    Nov. 24, 2016

(30) Foreign Application Priority Data

May 21, 2015    (TW) .............................. 104116186 A (51) Int. Cl.
*H02H 3/08*    (2006.01)
*H02J 7/00*    (2006.01)
*H02H 3/33*    (2006.01)

(52) U.S. Cl.
CPC .............. *H02H 3/335* (2013.01); *H02H 3/08* (2013.01); *H02J 7/0031* (2013.01)

(58) Field of Classification Search
CPC ............ H02H 3/335; H02H 9/00; H02H 3/08; H02H 3/006; H02H 3/087; H02H 3/338; H02H 11/002; H02H 3/16; H02J 7/00; H02J 7/0031; G08B 21/00; G01R 15/22; G01R 19/165; G01R 31/024; G01R 31/025; H01H 2083/045; H01H 83/04; H01H 83/144; H01H 2071/044; H01H 83/02; H03K 17/0822; H02M 1/32; H01R 3/71

USPC .......... 361/87; 320/163, 165, 111, 118, 104; 324/650
See application file for complete search history.

(56) References Cited

U.S. PATENT DOCUMENTS

| 6,266,219 | B1 * | 7/2001 | Macbeth | H02H 1/0015 324/424 |
| 8,174,244 | B2 * | 5/2012 | Otake | B60L 3/04 320/165 |
| 8,541,978 | B2 * | 9/2013 | Fukuo | B60L 3/0069 320/109 |

(Continued)

FOREIGN PATENT DOCUMENTS

TW    M385104 U    7/2010

*Primary Examiner* — Thienvu Tran
*Assistant Examiner* — Nicolas Bellido
(74) *Attorney, Agent, or Firm* — Muncy, Geissler, Olds & Lowe, P.C.

(57) ABSTRACT

A charging circuit interrupting device for applying an input voltage provided by first and second input power lines of a power system to first and second output power lines of an output system includes a current-detecting unit, a self-test device, and a controller. The current-detecting unit executes a leakage-detection function and generates a leakage signal when the current difference between the first and second power lines is detected. The self-test device generates a bypass path according to the detection enable signal so that there is a current difference between the first and the second input power lines. When operating in a self-test mode, the controller generates the detection enable signal, determines that the leakage-detecting function is normal, and enters a normal mode to apply the input voltage to the output system when the leakage signal is received.

18 Claims, 4 Drawing Sheets

(56) References Cited

U.S. PATENT DOCUMENTS

| | | | |
|---|---|---|---|
| 2009/0040666 A1* | 2/2009 | Elms | H02H 1/0015 361/42 |
| 2010/0033140 A1 | 2/2010 | Otake | |
| 2010/0194354 A1* | 8/2010 | Gotou | H02H 3/33 320/163 |
| 2011/0216453 A1* | 9/2011 | Haines | H02H 9/00 361/49 |
| 2012/0146655 A1* | 6/2012 | Suchoff | G01R 31/025 324/509 |
| 2013/0155563 A1* | 6/2013 | Huang | H01R 13/6683 361/93.1 |
| 2017/0222424 A1* | 8/2017 | Fukuo | H02G 15/068 |

\* cited by examiner

CHARGING CIRCUIT INTERRUPT DEVICES WITH SELF-TEST AND METHODS THEREOF

CROSS REFERENCE TO RELATED APPLICATIONS

This Application claims priority of Taiwan Patent Application No. 104116186, filed on May 21, 2015, the entirety of which is incorporated by reference herein.

BACKGROUND OF THE INVENTION

Field of the Invention

The disclosure relates generally to devices and methods for interrupting a charging circuit, and more particularly it relates to devices and methods for interrupting a charging circuit which is able to self-test the leakage-detecting function.

Description of the Related Art

When a system is coupled to a power system, the power is able to be immediately interrupted during a leak, which leads to effectively protecting the maintenance staff. Therefore, it is very important to keep the leakage-detecting function operating normally, and so devices and methods for self-testing the leakage-detecting function are needed.

BRIEF SUMMARY OF THE INVENTION

In an embodiment, what is provided is a charging circuit interrupt device for coupling a first power line of a power system to a first output power line of an output system and coupling a second input power line of the power system to a second output power line of the output system, such that the power system applies an input voltage to the output system, comprises a current-detecting unit, a self-test device, and a controller. The current-detecting unit executes a leakage-detecting function. The current-detecting unit generates a leakage signal when a current difference in a section of the first input power line and the second input power line is detected. The self-test device generates a bypass path according to a detection enable signal, such that a test current flows from a first node of the first input power line to a second node of the second input power line, and there is the current difference in the section. The controller generates the detection enable signal when the controller operates in a self-test mode. When the controller receives the leakage signal, the controller determines that the leakage-detecting function is normal, stops generating the detection enable signal, and enters a normal mode to apply the input voltage to the output system.

In an embodiment of the charging circuit interrupt device, when the controller hasn't received the leakage signal in a predetermined period, the controller determines that the leakage-detection function has failed and stops applying the input voltage to the output system.

In an embodiment of the charging circuit interrupt device, when the controller operates in the normal mode and receives the leakage signal, the controller stops applying the input voltage to the output system, wherein when the controller operates in the normal mode but hasn't received the leakage signal, the controller continues to apply the input voltage to the output system.

In an embodiment of the charging circuit interrupt device, the controller determines, according to a voltage signal, a voltage range of the input voltage to output a state signal, and the self-test device operates in either a first mode or a second mode according to the state signal.

In an embodiment, the charging circuit interrupt device further comprises a voltage-detecting device. The voltage-detecting device is configured to detect the input voltage of the first input power line and the second input power line to generate the voltage signal. The controller determines that the input voltage is in either a first voltage range or a second voltage range according to the voltage signal. The self-test device operates in the first mode when the input voltage is in the first voltage range. The self-test device operates in the second mode when the input voltage is in the second voltage range.

In an embodiment of the charging circuit interrupt device, the self-test device comprises a first resistor, a first detection switch, a second resistor, and a second detection switch. The first resistor is coupled between the first node and a first inner node. The first detection switch couples the first inner node to a second inner node according to the detection enable signal. The second resistor is coupled between the second inner node and the second node. The second detection switch couples the second inner node to the second node according to the state signal.

In an embodiment of the charging circuit interrupt device, the first inner node is coupled to the second inner node through the first detection switch, and the second inner node is coupled to the second node through the second detection switch when the self-test device operates in the first mode. The first inner node is coupled to the second inner node through the first detection switch, and the second detection switch is turned off when the self-test device operates in the second mode. The first detection switch and the second detection switch are turned off when the controller operates in the normal mode. The self-test device generates the identical test current in both the first mode and the second mode.

In an embodiment of the charging circuit interrupt device, each of the first detection switch and the second detection switch is an optical coupler.

In an embodiment of the charging circuit interrupt device, the charging circuit interrupt device further comprises a first switch and a second switch. The first switch couples the first input power line to the first output power line according to a first switch signal. The second switch couples the second input power line to the second output power line according to a second switch signal. When the controller operates in the self-test mode and determines that the leakage-detecting function is normal, the controller applies the input voltage to the output system by the first switch signal and the second switch signal. When the controller determines that the leakage-detecting function has failed, the controller stops applying the input voltage to the output system by the first switch signal and the second switch signal.

In an embodiment of the charging circuit interrupt device, when the controller operates in the normal mode and receives the leakage signal, the controller stops applying the input voltage to the output system by the first switch signal and the second switch signal. When the controller operates in the normal mode but hasn't received the leakage signal, the controller continues to apply the input voltage to the output system by the first switch signal and the second switch signal.

In an embodiment, a charging circuit self-test method, adapted for a charging circuit interrupt device coupling a first input power line of a power system to a first output power line of an output system and coupling a second input power line of the power system to a second output power line of the output system, such that the power system applies an input voltage to the output system, comprises: generating a detection enable signal when the charging circuit interrupt device operates in a self-test mode, wherein the self-test mode is configured to self-detect a leakage-detecting function; generating a bypass path by a self-test device according to the detection enable signal, such that a test current flows from a first node of the first input power line to a second node of the second input power line, and there is a current difference in a section of the first input power line and the second input power line; generating a leakage signal when the current difference in the section is detected; determining the leakage-detecting function is normal when the leakage signal is received; operating the charging circuit interrupt device in a normal mode; and applying the input voltage to the output system.

In an embodiment, the charging circuit self-test method further comprises: not receiving the leakage signal in a predetermined period; determining the leakage-detecting function has failed; and stopping the input voltage from being applied to the output system.

In an embodiment, the charging circuit self-test method further comprises: stopping the input voltage from being applied to the output system when the charging circuit interrupt device operates in the normal mode and receives the leakage signal; and continuing to apply the input voltage to the output system when the charging circuit interrupt device operates in the normal mode but hasn't received the leakage signal.

In an embodiment of the charging circuit self-test method, the step of generating the bypass path by the self-test device according to the detection enable signal further comprises: determining, according to a voltage signal, a voltage range of the input voltage to generate a state signal; and operating the self-test device in either a first mode or a second mode according to the state signal.

In an embodiment, the charging circuit self-test method further comprises: detecting the input voltage of the first input power line and the second input power line to generate the voltage signal; determining, according to the voltage signal, that the power system is applying the input voltage to generate the detection enable signal; determining the input voltage is in either a first voltage range or a second voltage range according to the voltage signal; operating the self-test device in the first mode when the input voltage is in the first voltage range; and operating the self-test device in the second mode when the input voltage is in the second voltage range.

In an embodiment of the charging circuit self-test method, the self-test device further comprises: a first resistor, a first detection switch, a second resistor, and a second detection switch. The first resistor is coupled between the first node and a first inner node. The first detection switch couples the first inner node to a second inner node according to the detection enable signal. The second resistor is coupled between the second inner node and the second node. The second detection switch couples the second inner node to the second node according to the state signal.

In an embodiment, the charging circuit self-test method further comprises: coupling the first inner node to the second inner node through the first detection switch, and coupling the second inner node to the second node through the second detection switch when the self-test device operates in the first mode; coupling the first inner node to the second inner node through the first detection switch, and turning off the second detection switch when the self-test device operates in the second mode, wherein the self-test device generates the identical test current in both the first mode and the second mode; and turning off the first detection switch and the second detection switch when the controller operates in the normal mode.

In an embodiment of the charging circuit self-test method, each of the first detection switch and the second detection switch is an optical coupler.

In an embodiment, the charging circuit self-test method further comprises: generating a first switch signal and a second switch signal when the charging circuit interrupt device operates in the self-test mode and the leakage-detecting function is determined to be normal; applying the input voltage to the output system according to the first switch signal and the second switch signal; generating the first switch signal and the second switch signal when the charging circuit interrupt device operates in the self-test mode and the leakage-detecting function is determined to be fail; and stopping the input voltage from being applied to the output system by the first switch signal and the second switch signal.

In an embodiment, the charging circuit self-test method further comprises: generating the first switch signal and the second switch signal when the charging circuit interrupt device operates in the normal mode and receives the leakage signal; stopping the input voltage from being applied to the output system according to the first switch signal; generating the first switch signal and the second switch signal when the charging circuit interrupt device operates in the normal mode and hasn't received the leakage signal; and continuing to apply the input voltage to the output system according to the first switch signal and the second switch signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
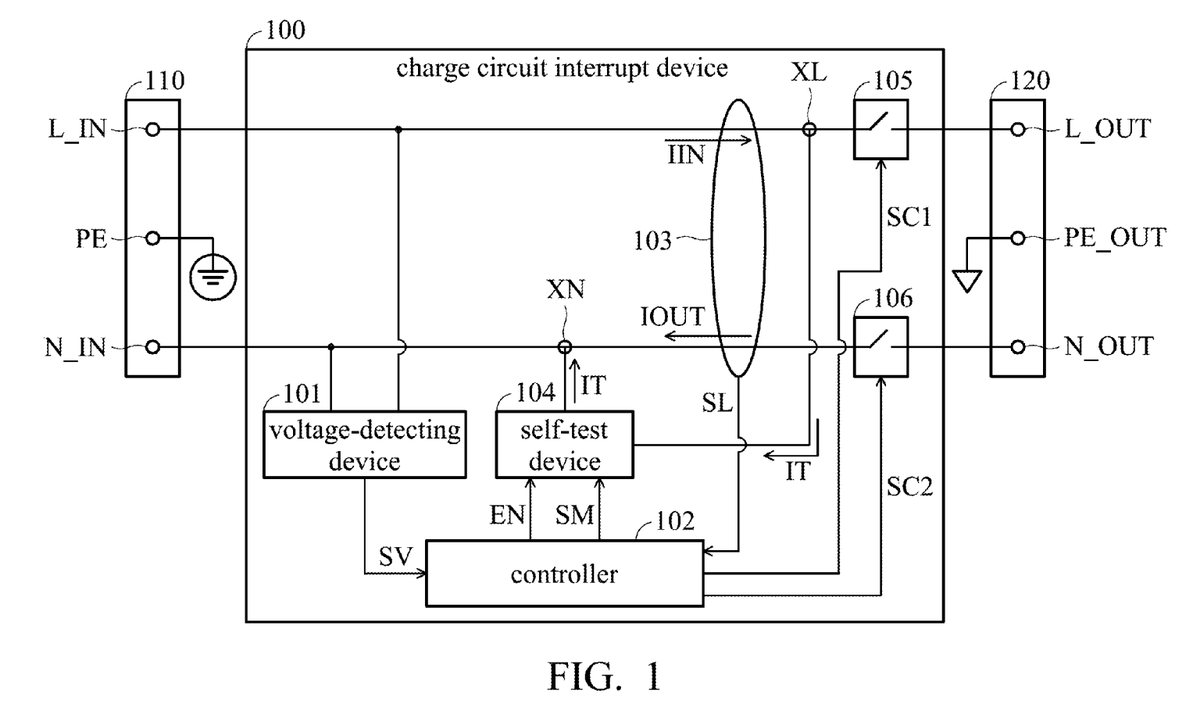
FIG. 1 is a block diagram of an charging circuit interrupt device in accordance with an embodiment of the invention.

FIG. 1 is a block diagram of an interrupt charging circuit device in accordance with an embodiment of the invention. As shown in FIG. 1, the charge circuit interrupt device 100 is configured to apply the input voltage of the power system 110 to the output system 120. The first input power line L_IN and the second input power line N_IN of the power system 110 are respectively coupled to the first output power line L_OUT and the second output power line N_OUT of the output system 120. The protective earth PE of the power system 110 is substantially coupled to the output protective earth PE_OUT of the output system 120. According to an embodiment of the invention, there is a resistive unit between the protective earth PE and the output protective earth PE_OUT, in which the resistive unit is configured to isolate noise.

The charging circuit interrupt device 100 includes the voltage-detecting device 101, the controller 102, the current-detecting unit 103, the self-test device 104, the first switch 105, and the second switch 106. The voltage-detecting device 101 detects the first input power line L_IN and the second input power line N_IN of the power system to generate the voltage signal SV to the controller 102. When determining, according to the voltage signal SV, that the input voltage is provided by the power system 110, the controller 102 generates the detection enable signal EN to the self-test device 104.

According to an embodiment of the invention, the current-detecting unit 103 has a leakage-detecting function of which is configured to detect the current difference between a flowing-in current and the flowing-out current. For example, a current difference between the flowing-in current IIN through the first input power line L_IN and the flowing-out current IOUT through the second input power line N_IN can be detected during half-cycle of the power system 110. When there is a current difference between the flowing-in current IIN and the flowing-out current IOUT, the current-detecting unit 103 generates the leakage signal SL to the controller 102. When the controller 102 receives the leakage signal SL, the controller 102 stops applying the input voltage of the first input power line L_IN and the second input line N_IN to the output system 120. According to an embodiment of the invention, the current-detecting unit 103 is a current transformer.

According to an embodiment of the invention, when the controller 102 decides to apply the input voltage of the power system 110 to the output system 120, the controller 102 turns on the first switch 105 by the first switch signal SC1 and turns on the second switch 106 by the second switch signal SC2.

The controller 102 operates in a normal mode and a self-test mode. When the controller 102 operates in the normal mode, the controller 102 applies the input voltage of the power system 110 to the output system 120, and the current-detecting unit 103 detects whether there is a current difference between the flowing-in current IIN and the flowing-out current IOUT to generate leakage signal SL.

According to an embodiment of the invention, when the controller 102 operates in the normal mode, the controller 102 determines that the flowing-in current IIN is not equal to the flowing-out current IOUT according to the leakage signal SL, which means a leakage current has occurred. Then, the controller 102 turns off the first switch 105 by the first switch signal SC1 and turns off the second switch 106 by the second switch signal SC2, in order to stop generating the input voltage of the power system 110 to the output system 120.

According to another embodiment of the invention, when the controller 102 operates in the normal mode, the controller 102 doesn't receive the leakage signal SL, which means the operation is normal. Then, the controller 102 keeps to apply the input voltage of the power system 110 to the output system 120 by the first switch signal SC1 and the second switch signal SC2.

According to an embodiment of the invention, before the controller 102 operates in the normal mode, i.e. before the input voltage of the power system 110 is applied to the output system 120, the controller 102 first operates in the self-test mode to self-test whether the current-detecting unit 103 is functional. When the controller 102 operates in the self-test mode, the controller 102 enables the self-test device 104 by the detection enable signal EN. Then, the self-test device 104 flows the test current IT from the first node XL to the second node XN to simulate the leaking situation in reality, such that the flowing-in current IIN is not equal to the flowing-out current IOUT in the section of the first input power line L_IN and the second input power line N_IN which is detected by the current-detecting unit 103. The leakage-detecting function of the current-detecting unit 103 is therefore self-tested.

The controller 102 further determines the voltage range of the input voltage according to the voltage signal SV generated by the voltage-detecting circuit 101. The controller 102 further generates the state signal SM to the self-test device 104 according to the voltage range of the input voltage, such that the test current IT is identical for different voltage ranges of the input voltage. How to generate the test current IT will be described in detail in the following description.

When the controller 102 operates in the self-test mode, the current-detecting unit 103 detects a current difference, which is between the flowing-in current IIN and the flowing-out current IOUT, to generate the leakage signal SL to the controller 102. When the controller receives the leakage signal SL, it means that the leakage-detecting function of the current-detecting unit 103 works well. Then, the first switch 105 is turned on by the first control signal SC1 and the second switch 106 is turned on by the second switch signal SC2, such that the input voltage of the power system 110 is applied to the output system 120.

When the controller 102 operates in the self-test mode, the current-detecting unit 103 doesn't generate the leakage signal SL, which leads to the leakage-detecting function of the current-detecting unit 103 being abnormal. According to an embodiment of the invention, when the controller 102 doesn't receive the leakage signal SL, the first control signal SC1 and the second control signal SC2 are respectively configured to turn off the first switch 105 and the second switch 106, in order to stop applying the input voltage of the power system 110 to the output system 120.

When the controller 102 operates in the normal mode and the current-detecting unit 103 detects that there is the first current difference between the flowing-in current IIN and the flowing-out current IOUT, the current-detecting unit 103 generates the leakage signal SL. When the controller 102 operates in the self-test mode and the current-detecting unit 103 detects that there is the second current difference between the flowing-in current IIN and the flowing-out current IOUT, the current-detecting unit 103 generates the leakage signal SL. According to an embodiment of the invention, the first current difference is equal to the second current difference. According to another embodiment of the invention, the first current difference is not equal to the second current difference.

According to another embodiment of the invention, when the controller 102 operates in the self-test mode and hasn't received the leakage signal SL in a predetermined period, the controller 102 determines that the leakage-detecting function of the current-detecting unit 103 has failed and continuously turns off the first switch 105 and the second switch 106 to isolate the power system 110 from the output system 120. According to an embodiment of the invention, when the controller 102 hasn't receive the leakage signal SL in the predetermined period, it means that the leakage-detecting function of the current-detecting unit 103 is abnormal, and the controller 102 further generates an alarm to inform the user that the current-detecting unit 103 is abnormal.

Figure 2:
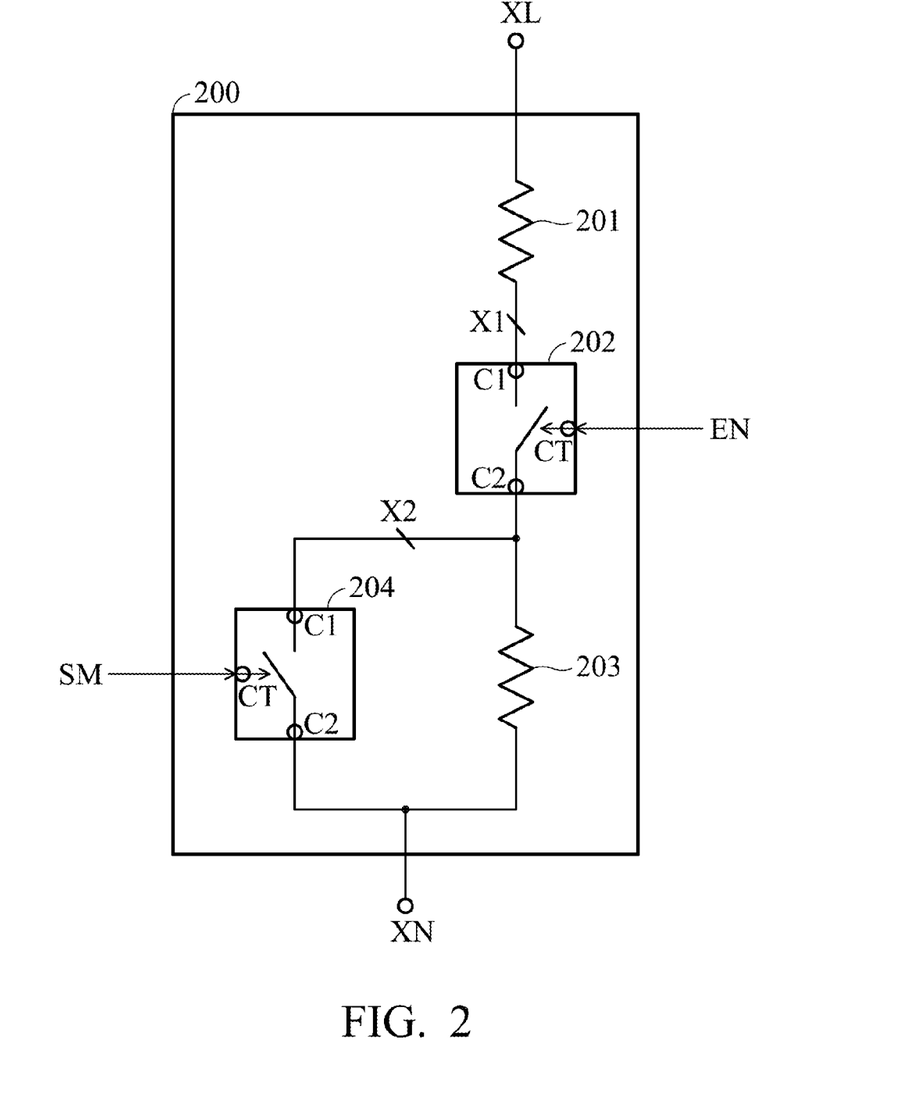
FIG. 2 is a block diagram of a self-test device in accordance with an embodiment of the invention.

According to an embodiment of the invention, when the controller 102 operates in the self-test mode and hasn't received the leakage signal SL in 60 ms, the controller 102 determines that the leakage-detecting function of the current-detecting unit 103 has failed. According to other embodiments of the invention, the designer could determine the length of the predetermined period FIG. 2 is a block diagram of a self-test device in accordance with an embodiment of the invention. As shown in FIG. 2, the self-test device 200 includes the first resistor 201, the first detection switch 202, the second resistor 203, and the second detection switch 204, in which the self-test device 200 is coupled between first node XL and the second node XN in FIG. 1. According to an embodiment of the invention, each of the first detection switch 202 and the second detection switch 204 is an optical coupler.

As shown in FIG. 2, the first resistor 201 is coupled between the first node XL and the first inner node X1. The first detection switch 202 is a detection switch which includes the first switch node C1, the second switch node C2, and the control node CT. The first switch node C1 is coupled to the second switch node C2 by the control node CT. The first inner node X1 is coupled to the second inner node X2 through the first detection switch 202 according to the detection enable signal EN generated by the controller 102 in FIG. 1. The second resistor 203 is coupled between the second inner node X2 and the second node XN, and the second inner node X2 is coupled to the second node XN through the second detection switch 204 according to the state signal SM.

According to an embodiment of the invention, when the self-test device 200 operates in the first mode, the first inner node X1 is coupled to the second inner node X2 through the first detection switch 202, and the second inner node X2 is coupled to the second node XN through the second detection switch 204. According to another embodiment of the invention, when the self-test device 200 operates in the second mode, the first inner node X1 is coupled to the second inner node X2 through the first detection switch 202, and the second detection switch 204 is turned off. According to yet another embodiment of the invention, when the self-test device 200 doesn't receive the detection enable signal EN, the first detection switch 202 and the second detection switch 204 are both turned off.

According to an embodiment of the invention, when the input voltage is between 100V to 120V, the second detection switch 204 is turned on according to the state signal SM, and the test current IT flows. According to another embodiment of the invention, when the input voltage is between 200V to 240V, the second detection switch 204 is turned off according to the state signal SM. In addition, the first resistor 201 and the second resistor 203 have identical resistance.

Therefore, when the input voltage is between 200V to 240V, the test current IT flows through the first resistor 201 and the second resistor 203. When the input voltage is between 100V to 120 V, the test current IT flows through the first resistor 201. That is, the self-test device 200 is configured to generate the test current IT with an identical current value when the input voltage is in different voltage ranges.

Figure 3:
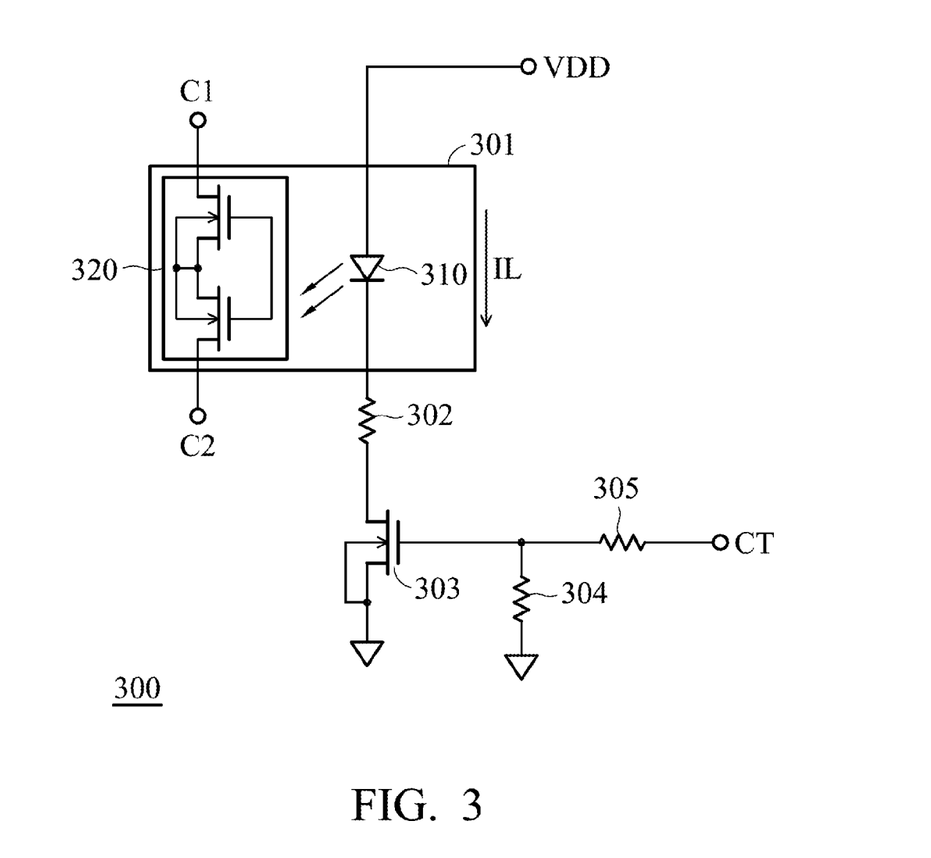
FIG. 3 is a block diagram of a detection switch in accordance with an embodiment of the invention.

FIG. 3 is a block diagram of a detection switch in accordance with an embodiment of the invention. The detection switch 300 in FIG. 3 is an embodiment of the first detection switch 202 and the second detection switch 204 in FIG. 2. As shown in FIG. 3, the detection switch 300 includes the first switch node C1, the second switch node C2, and the control node CT, and also includes the optical coupler 301, the first current-limit resistor 302, the transistor 303, the first bias resistor 304, and the second bias resistor 305.

The optical coupler 301 includes the light-emitting diode 310 and the opto-transistor switch 320. The opto-transistor switch 320 is turned on by the light generated by the light current IL flowing through the light-emitting diode 310 so that the first switch node C1 is coupled to the second switch node C2. When the transistor 303 turns on, the light current IL flows from the supply voltage VDD to the output protective earth PE_OUT, and the first current-limit resistor 302 is configured to control the magnitude of the light current IL. The control node CT is coupled to the control signal and divided by a voltage ladder formed by the first bias resistor 304 and the second bias resistor 305 for properly biasing the transistor 303. The optical coupler 301 is configured to achieve the purpose of isolation.

According to an embodiment of the invention, when it is necessary to turn on the detection switch 300, the control node CT receives the high logic level to turn on the transistor 303. When the light generated by the light current IL flowing through the light-emitting diode 310 turns on the opto-transistor switch 320, the first switch node C1 is then coupled to the second switch node C2.

Figure 4:
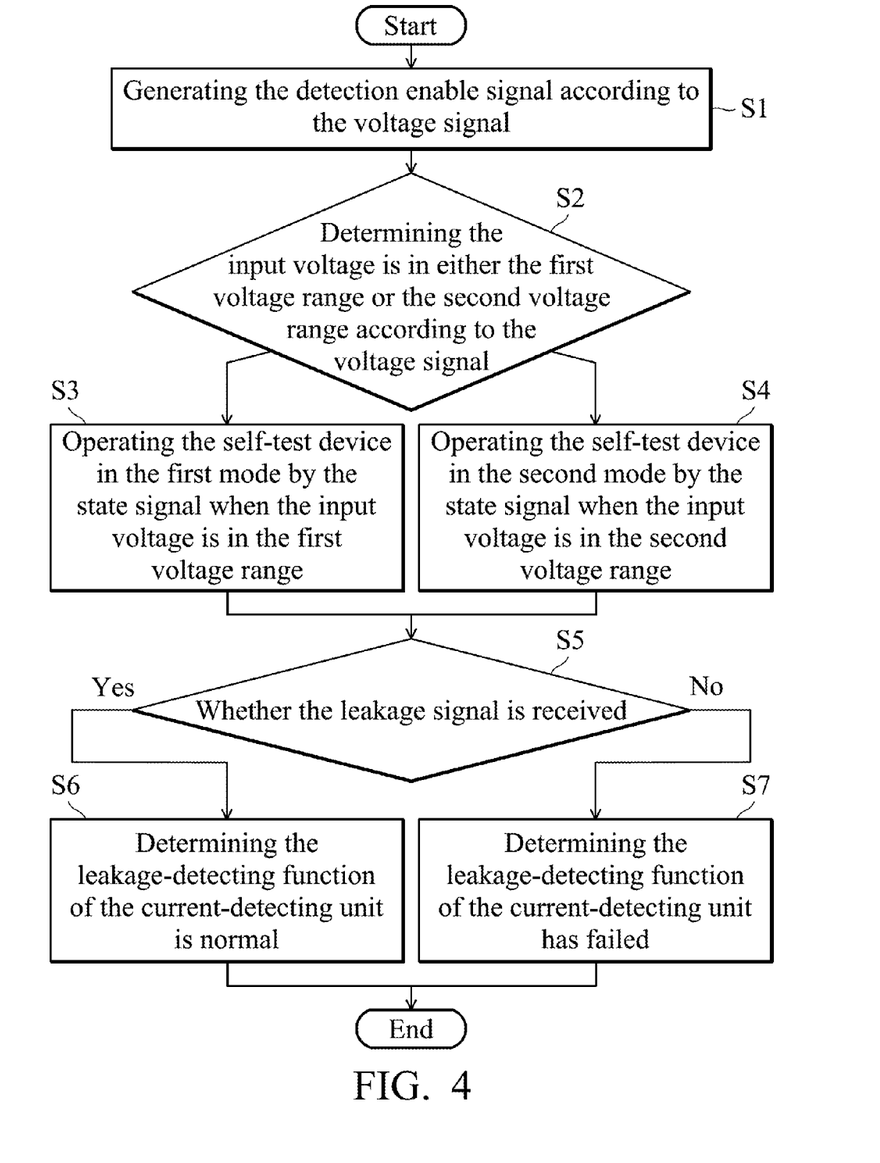
FIG. 4 is a flow chart of a charging circuit self-test method in accordance with an embodiment of the invention.

FIG. 4 is a flow chart of a charging circuit self-test method in accordance with an embodiment of the invention. The following description for FIG. 4 will be described in detail with FIG. 1.

First, the detection enable signal EN is generated according to the voltage signal SV (Step S1). When the voltage-detecting device 101 detects the input voltage of the first input power line L_IN and the second input power line N_IN to generate the voltage signal SV, the controller 102, according to the voltage signal SV, determines that the power system 110 is applying the input voltage to generate the detection enable signal EN for enabling the self-test device 104. Then, the controller 102 in FIG. 1 determines that the input voltage is in either the first voltage range or the second voltage range according to the voltage signal (Step S2).

When the input voltage is in the first voltage range, the controller 102 operates the self-test device 104 in the first mode by the state signal SM (Step S3). That is, the first inner node X1 is coupled to the second inner node X2 through the first detection switch 202 in FIG. 2 by the detection enable signal EN, and the second inner node X2 is coupled to the second node XN through the second detection switch 204 in FIG. 2 by the state signal.

When the input voltage is in the second voltage range, the controller 102 operates the self-test device 104 in the second mode by the state signal SM (Step S4). That is, the first inner node X1 is coupled to the second inner node X2 through the first detection switch 202 in FIG. 2 by the detection enable signal EN, and the section switch 204 is turned off by the state signal SM.

In Step S3 and Step S4, the self-test device 104 controls the test current IT to flow from the first node XL of the first input power line L_IN to the second node XN of the second input power line N_IN so that the flowing-in current IIN is not equal to the flowing-out current IOUT in the section of the first input power line L_IN and the second input power line N_IN that is detected by the current-detecting unit 103, and the current difference between the first input power line L_IN and the second input power line N_IN is generated. When the current difference between the first input power line L_IN and the second input power line N_IN is detected by the current-detecting unit 103, the leakage signal SL is generated. According to an embodiment of the invention, the identical test current IT is generated when the self-test device 104 operates in either the first mode or the second mode.

Then, the controller 102 determines whether the leakage-detecting function of the current-detecting unit 103 is normal or not according to whether the leakage signal SL being received (Step S5). When the leakage signal SL is received, the controller 102 determines that the leakage-detecting function of the current-detecting unit 103 is normal (Step S6), and the controller 102 enters the normal mode. When the leakage signal SL is not received, the controller 102 determines that the leakage-detecting function of the current-detecting unit 103 has failed (Step S7), and the controller 102 stops applying the input voltage to the output system 120.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A charging circuit interrupt device for coupling a first power line of a power system to a first output power line of an output system and coupling a second input power line of the power system to a second output power line of the output system, such that the power system applies an input voltage to the output system, comprising:
   a current-detecting unit, executing a leakage-detecting function, wherein the current-detecting unit generates a leakage signal when a current difference in a section of the first input power line and the second input power line is detected;
   a self-test device, generating a bypass path according to a detection enable signal, such that a test current flows from a first node of the first input power line to a second node of the second input power line, and there is the current difference in the section; and
   a controller, generating the detection enable signal when the controller operates in a self-test mode, wherein when the controller receives the leakage signal, the controller determines that the leakage-detecting function is normal, stops generating the detection enable signal, and enters a normal mode to apply the input voltage to the output system, wherein the controller determines, according to a voltage signal, a voltage range of the input voltage to output a state signal, and the self-test device operates in either a first mode or a second mode according to the state signal, wherein the bypass path has a first resistance when the self-test device operates in the first mode, wherein the bypass path has a second resistance when the self-test device operates in the second mode.

2. The charging circuit interrupt device of claim 1, wherein when the controller hasn't received the leakage signal in a predetermined period, the controller determines that the leakage-detection function has failed and stops applying the input voltage to the output system.

3. The charging circuit interrupt device of claim 1, wherein when the controller operates in the normal mode and receives the leakage signal, the controller stops applying the input voltage to the output system, wherein when the controller operates in the normal mode but hasn't received the leakage signal, the controller continues to apply the input voltage to the output system.

4. The charging circuit interrupt device of claim 1, further comprising:
   a voltage-detecting device, configured to detect the input voltage of the first input power line and the second input power line to generate the voltage signal, wherein the controller determines that the input voltage is in either a first voltage range or a second voltage range according to the voltage signal,
   wherein the self-test device operates in the first mode when the input voltage is in the first voltage range, wherein the self-test device operates in the second mode when the input voltage is in the second voltage range.

5. The charging circuit interrupt device of claim 4, wherein the self-test device comprises:
   a first resistor, coupled between the first node and a first inner node;
   a first detection switch, coupling the first inner node to a second inner node according to the detection enable signal;
   a second resistor, coupled between the second inner node and the second node; and
   a second detection switch, coupling the second inner node to the second node according to the state signal.

6. The charging circuit interrupt device of claim 5, wherein the first inner node is coupled to the second inner node through the first detection switch, and the second inner node is coupled to the second node through the second detection switch when the self-test device operates in the first mode, wherein
   the first inner node is coupled to the second inner node through the first detection switch, and the second detection switch is turned off when the self-test device operates in the second mode, wherein
   the first detection switch and the second detection switch are turned off when the controller operates in the normal mode, wherein
the self-test device generates the identical test current in both the first mode and the second mode.

7. The charging circuit interrupt device of claim 5, wherein each of the first detection switch and the second detection switch is an optical coupler.

8. The charging circuit interrupt device of claim 3, further comprising:
   a first switch, coupling the first input power line to the first output power line according to a first switch signal; and
   a second switch, coupling the second input power line to the second output power line according to a second switch signal, wherein when the controller operates in the self-test mode and determines that the leakage-detecting function is normal, the controller applies the input voltage to the output system by the first switch signal and the second switch signal, wherein when the controller determines that the leakage-detecting function has failed, the controller stops applying the input voltage to the output system by the first switch signal and the second switch signal.

9. The charging circuit interrupt device of claim 8, wherein when the controller operates in the normal mode and receives the leakage signal, the controller stops applying the input voltage to the output system by the first switch signal and the second switch signal, wherein when the controller operates in the normal mode but hasn't received the leakage signal, the controller continues to apply the input voltage to the output system by the first switch signal and the second switch signal.

10. A charging circuit self-test method, adapted for a charging circuit interrupt device coupling a first input power line of a power system to a first output power line of an output system and coupling a second input power line of the power system to a second output power line of the output system, such that the power system applies an input voltage to the output system, comprising:
   generating a detection enable signal when the charging circuit interrupt device operates in a self-test mode, wherein the self-test mode is configured to self-detect a leakage-detecting function;
   generating a bypass path by a self-test device according to the detection enable signal, such that a test current flows from a first node of the first input power line to a second node of the second input power line, and there is a current difference in a section of the first input power line and the second input power line, wherein the step of generating the bypass path by the self-test device according to the detection enable signal further comprises:
   determining, according to a voltage signal, a voltage range of the input voltage to generate a state signal; and
   operating the self-test device in either a first mode or a second mode according to the state signal, wherein the bypass path has a first resistance when the self-test device operates in the first mode, wherein the bypass path has a second resistance when the self-test device operates in the second mode;
   generating a leakage signal when the current difference in the section is detected;
   determining the leakage-detecting function is normal when the leakage signal is received;
   operating the charging circuit interrupt device in a normal mode; and
   applying the input voltage to the output system.

11. The charging circuit self-test method of claim 10, further comprising:
   not receiving the leakage signal in a predetermined period;
   determining the leakage-detecting function has failed; and
   stopping the input voltage from being applied to the output system.

12. The charging circuit self-test method of claim 10, further comprising:
   stopping the input voltage from being applied to the output system when the charging circuit interrupt device operates in the normal mode and receives the leakage signal; and
   continuing to apply the input voltage to the output system when the charging circuit interrupt device operates in the normal mode but hasn't received the leakage signal.

13. The charging circuit self-test method of claim 10, further comprising:
   detecting the input voltage of the first input power line and the second input power line to generate the voltage signal;
   determining, according to the voltage signal, that the power system is applying the input voltage to generate the detection enable signal;
   determining the input voltage is in either a first voltage range or a second voltage range according to the voltage signal;
   operating the self-test device in the first mode when the input voltage is in the first voltage range; and
   operating the self-test device in the second mode when the input voltage is in the second voltage range.

14. The charging circuit self-test method of claim 13, wherein the self-test device further comprises:
   a first resistor, coupled between the first node and a first inner node;
   a first detection switch, coupling the first inner node to a second inner node according to the detection enable signal;
   a second resistor, coupled between the second inner node and the second node; and
   a second detection switch, coupling the second inner node to the second node according to the state signal.

15. The charging circuit self-test method of claim 14, further comprising:
   coupling the first inner node to the second inner node through the first detection switch, and coupling the second inner node to the second node through the second detection switch when the self-test device operates in the first mode;
   coupling the first inner node to the second inner node through the first detection switch, and turning off the second detection switch when the self-test device operates in the second mode, wherein the self-test device generates the identical test current in both the first mode and the second mode; and
   turning off the first detection switch and the second detection switch when the controller operates in the normal mode.

16. The charging circuit self-test method of claim 14, wherein each of the first detection switch and the second detection switch is an optical coupler.

17. The charging circuit self-test method of claim 12, further comprising:
   generating a first switch signal and a second switch signal when the charging circuit interrupt device operates in the self-test mode and the leakage-detecting function is determined to be normal;
   applying the input voltage to the output system according to the first switch signal and the second switch signal;
   generating the first switch signal and the second switch signal when the charging circuit interrupt device operates in the self-test mode and the leakage-detecting function is determined to be fail; and
   stopping the input voltage from being applied to the output system by the first switch signal and the second switch signal.

18. The charging circuit self-test method of claim 17, further comprising:
   generating the first switch signal and the second switch signal when the charging circuit interrupt device operates in the normal mode and receives the leakage signal;
   stopping the input voltage from being applied to the output system according to the first switch signal;
   generating the first switch signal and the second switch signal when the charging circuit interrupt device operates in the normal mode and hasn't received the leakage signal; and
   continuing to apply the input voltage to the output system according to the first switch signal and the second switch signal.

* * * * *